Dec. 28, 1948.  V. F. MILLER  2,457,589
WIPER ASSEMBLY FOR STEP-BY-STEP SWITCHES
Filed Dec. 18, 1946  2 Sheets-Sheet 1

INVENTOR
V. F. MILLER
BY
P. C. Smith
ATTORNEY

Dec. 28, 1948.   V. F. MILLER   2,457,589
WIPER ASSEMBLY FOR STEP-BY-STEP SWITCHES
Filed Dec. 18, 1946   2 Sheets-Sheet 2
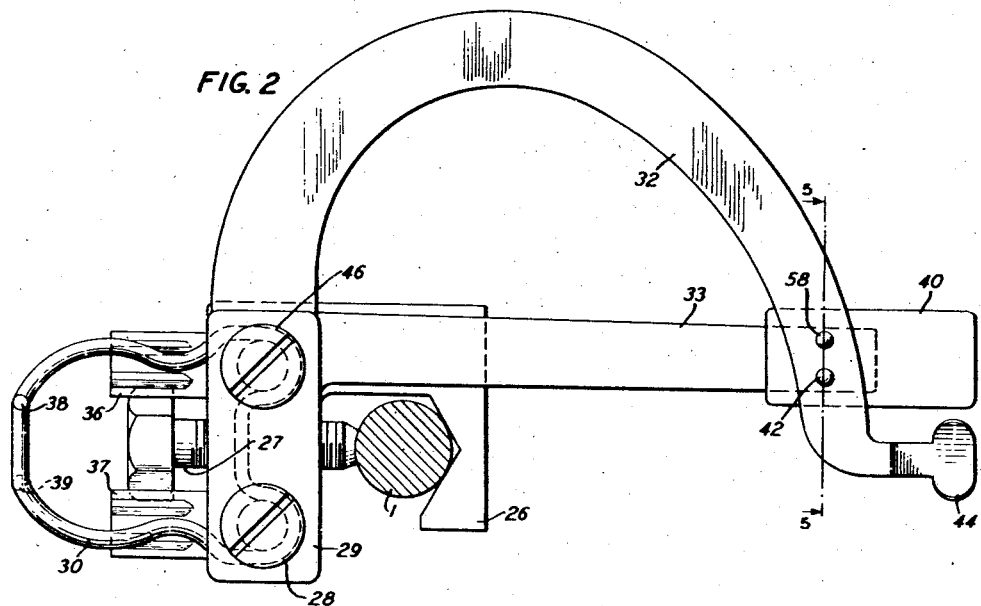
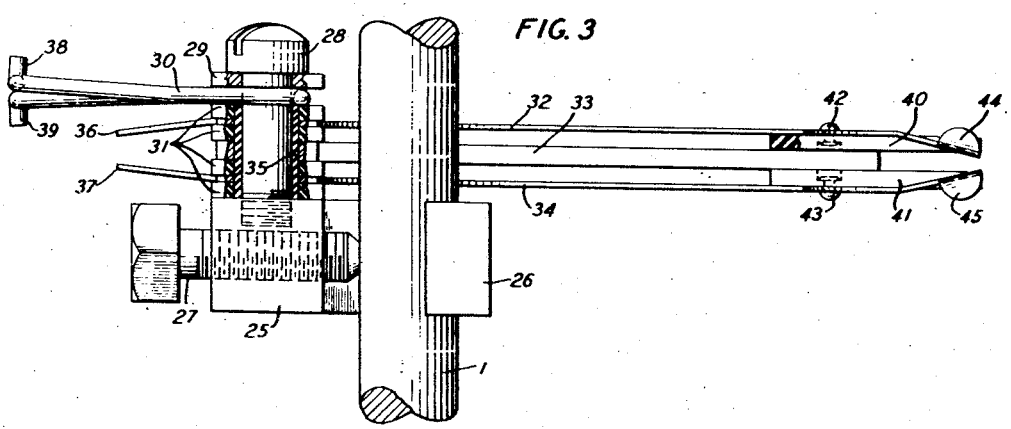
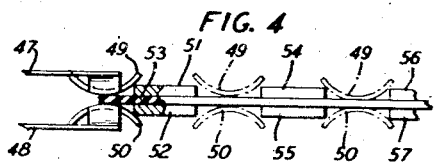
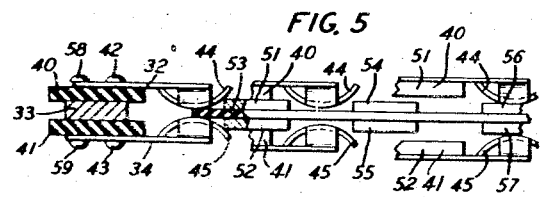
INVENTOR
V. F. MILLER
BY
P. C. Smith
ATTORNEY Patented Dec. 28, 1948

2,457,589

UNITED STATES PATENT OFFICE 2,457,589

WIPER ASSEMBLY FOR STEP-BY-STEP SWITCHES

Victor F. Miller, Queens Village, N. Y., assignor to Bell Telephone Laboratories, Incorporated, New York, N. Y., a corporation of New York Application December 18, 1946, Serial No. 717,053

6 Claims. (Cl. 179—27.52)

This invention relates to electrical switching devices and particularly to improvements in switches used for the establishment of connections between subscribers' lines in automatic telephone systems.

The object is to simplify and improve from operation, installation and replacement standpoints, certain parts of automatic switching devices.

Heretofore in automatic switches, particularly of the step-by-step type having wiper assemblies and mechanism for guiding such wipers over contacts to establish telephone connections, the tips of contacting arms of such wiper assemblies pass over successive contacts in a contact bank of said switch. The contacts generally are separated from each other by insulators located below the level of the said contacts, upon which insulators the wiper arm tips rest when traveling between contacts. These wiper arm tips usually are U-shaped such that the upturned ends cannot bridge adjacent contacts when the bottom part of the U is resting upon the aforementioned insulators. Upon repeated operation of such wiper arm tips the bottom of the U has become worn to such an extent as to permit the upturned ends of the U to bridge or short circuit adjacent contacts of the contact bank.

The invention herein set forth provides insulating means attached to each wiper arm near the tips thereof and adapted to follow the tips over the contacts. The insulating means, preferably comprising an insulator attached to the wiper tip, slides across succeeding contacts to prevent the wiper arm tips attached thereto from dropping too far below the level of the contact surfaces so as to create short circuits or bridges between adjacent contacts.

The invention has been illustrated in the accompanying drawings in which:

Fig. 2 illustrates an enlarged plan view of the wiper assembly shown in Fig. 1.

Fig. 3 is an elevation of Fig. 2 partly in section.

Figs. 4 and 5 illustrate, in connection with subsequent description, an operating feature of the type of wiper assembly disclosed in previous figures.

Figure 1:
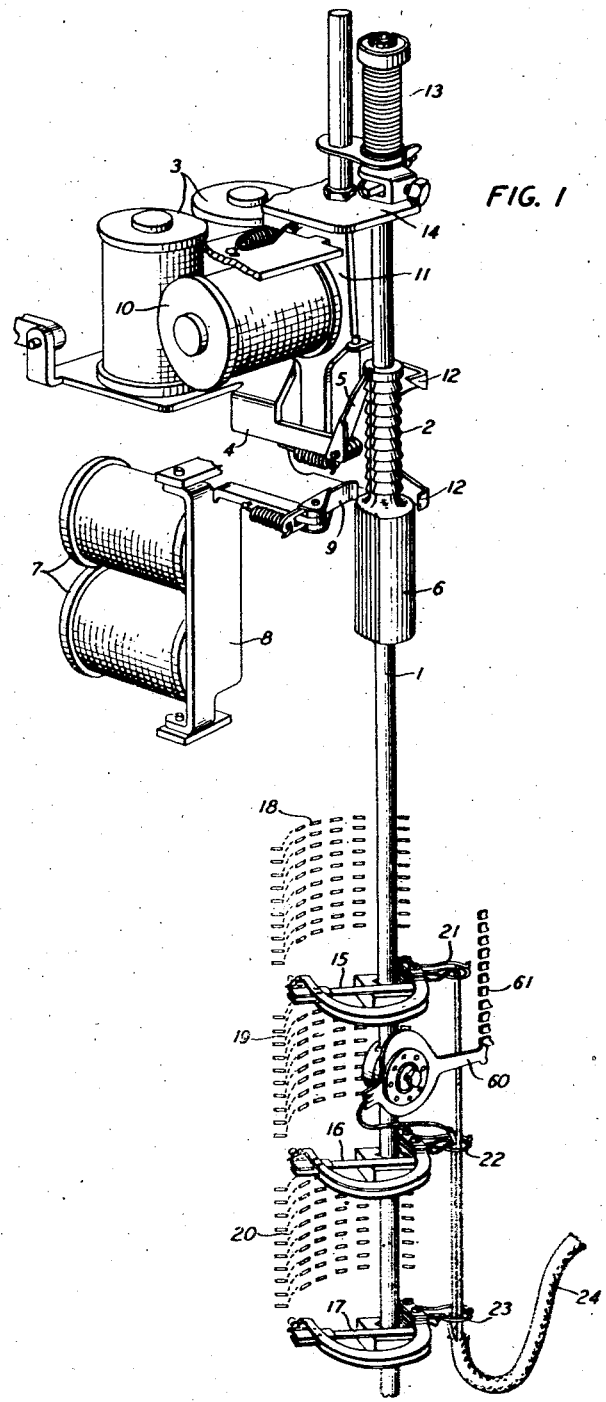
Fig. 1 shows an automatic step-by-step switch of the Strowger type in a simplified form with the invention applied to the wiper assemblies on the shaft.

Referring now to the drawings, and particularly to Fig. 1 thereof, the Strowger switch shown in this figure is illustrated in a somewhat simplified form for the sake of clearness. The usual central wiper carrying shaft 1 has been shown with the vertical ratchet 2. A vertical magnet 3, an armature 4 operated thereby and an actuating pawl 5 engaging the ratchet 2 have been shown for lifting the shaft in a vertical direction. Below the ratchet 2 is shown a rotary ratchet 6, rotary magnet 7, armature 8 and actuating pawl 9 engaging the ratchet 6 to rotate the shaft for locating the wipers at the desired terminals. Release magnet 10 has been shown with its armature 11 and double-dog pawl 12 operated by the armature 11 to release the shaft from an actuated position. The retractile spring assembly 13 is shown attached to the upper end of the shaft 1, one end of this spring being connected to the shaft and at the other end to the frame 14.

At the lower end of the shaft 1 has been shown wiper assemblies 15, 16 and 17 and corresponding banks of terminals 18, 19 and 20 to which connections may be made by the corresponding wipers being lifted in a vertical direction and then rotated to engage the desired terminals. The usual arrangement is for the wipers 15 to establish connections for the sleeve conductors, and wipers 16 and 17 for tip and ring conductors. These wipers are assembled with guide rings 21, 22 and 23, respectively. Into the guide rings cords 24 may be inserted and soldered to projections on the wipers as will hereinafter be described.

Figs. 2 and 3 as previously mentioned are enlarged plan and elevation views respectively of one of the wipers such as 15 of Fig. 1. The main body 25 of this wiper assembly is constructed of suitable material such as metal having a vise-like extension 26 and adapted by means of set screw 27 threaded in a suitably tapped hole in the body 25, to clamp the wiper assembly about the shaft 1 as shown. The opening in the jaw of this body member between the main member 25 and the extension 26 thereof is dimensionally suited to allow the shaft 1 to be easily inserted therein without requiring relative motion between said body member 25 and said shaft 1 in a direction axial to said shaft. In a spring pileup assembly on the wiper body 25 and fastened thereto by means of screws 28 and 46 are a metal retaining plate 29, a cord guide ring 30, suitable insulating strips 31, an upper wiper arm 32, a lower wiper arm 34 and an intermediate resilient metallic member 33 which is separated from said wiper arms by means of two of said insulator strips 31. This member 33 may be of any suitable resilient material, metal being merely exemplary for the sake of the disclosure. The wiper arms 32 and 34, as illustrated best in Fig. 2, are curved to present the least twisting force to these arms as the wiper assemblies are rotated clockwise as viewed in Fig. 1. The resilient metallic member 33, as best illustrated in Fig. 2, is a straight portion extending directly from the pileup assembly to the proximity of the wiper tips 44 and 45. This member acts not only as a separator for the wipers but also as a damping member to inhibit chatter or rebound of said wipers. In the proximity of the wiper tips, such as 44 and 45 for wiper arms 32 and 34 respectively, there is riveted or otherwise attached to each wiper arm an insulator member such as 40 for wiper arm 32, and 41 for wiper arm 34. These insulators are seen normally to rest upon member 33 by reason of the pretensioning of the respective wiper arms towards each other. These insulators 40 and 41 are hereinafter referred to as "trailing shoes." The guide ring 30 is seen to be rigidly fixed in the pileup assembly and constructed similarly to a split key-ring. The material used for this guide ring is preferably metal and preferably resilient. The projections 38 and 39 represent two free circumferential ends of the guide ring 30 pretensioned to engage each other with appreciable force. These ends are arranged such that by a slight pressure, such as applied by a person's fingers, they will separate to allow cords such as 24 in Fig. 1 to be inserted therein.

Heretofore in the art, with reference to Fig. 4, the wiper arms, such as 47 and 48 with tips 49 and 50 respectively, when passing across a horizontal group of contacts in such a bank of terminals as illustrated by 18 in Fig. 1, have a tendency to wear and present the possibility of short-circuiting contacts such as 54 and 56 or 55 and 57. The dotted position of wiper tips 49 and 50 shown between contacts 54 and 56 and between 55 and 57 have been shown as worn at their contact area to illustrate that this wear may allow these tips to bridge these contact pairs. The previously mentioned trailing shoes prevent or eliminate possibility of this undesirable condition. As indicated in Fig. 5, the trailing shoes 40 and 41 for wiper arms 32 and 34 respectively have interposed therebetween the resilient metallic member 33. Upon the passing of the wiper tips 44 and 45 across contacts such as 51 and 52 suitable electrical contact will be made thereto. Subsequent to having passed across contacts 51 and 52, the wiper tips 44 and 45 will be prevented from dropping too far into the space between contacts, such as between contacts 51 and 54, to thereby eliminate any possibility of short-circuiting these contacts by bridging same as illustrated may happen in previous arrangement as per Fig. 4. It is seen that the trailing shoes 40 and 41 provide this feature by respectively resting upon and sliding across contacts 51 and 52 as the wiper tips 44 and 45 leave these contacts.

Referring now to Fig. 1, in connecting the cords 24 through the guide rings 21, 22 and 23 to the respective wiper assemblies, the cord may consist, as shown, of seven individual conductors. All of these are inserted into the lower guide ring 23 and then two of these conductors are connected individually to projections such as 36 and 37 of the wiper 17, these projections being illustrated in Figs. 2 and 3. The remaining conductors are inserted into the guide ring 22 and then two of the conductors are connected to the wiper 16 in the same manner. Then an additional conductor is extended to be connected to the special wiper 60. This wiper and corresponding contact bank 61 are provided in certain types of step-by-step switches as is well known. The remaining two conductors are then inserted into the upper guide ring 21 and connected to the wiper 15.

It is readily seen that by reason of the particular type of guide ring disclosed, any number of individual conductors in the cords 24 may be removed from or inserted into any of the guide rings on any wiper assembly without necessitating removal of either wiper assemblies or rings.

It is also apparent that any wiper assembly such as 15 may be readily detached from the shaft 1 by virtue of its vise-like construction without necessitating removal from said shaft of any other wiper.

It will readily be appreciated by those skilled in the art that wiper assemblies embodying the improvements disclosed herein will lend operating, installation and maintenance advantages to the switches to which they are applied.

The split ring type of cord guide disclosed herein is disclosed and claimed in my copending application Serial No. 717,052 filed December 18, 1946 and allowed June 16, 1948.

What is claimed is:

1. In a switch a wiper assembly comprising a body member adapted to be attached to a shaft of said switch, two electrically conductive resilient wiper arms insulatedly attached to said body member at one end of each of said two arms, the free ends of said two arms pretensioned to flex toward each other, a third arm extending from said body member and extending between the free ends of said two arms, and an insulating member attached to each arm near the free end thereof for separating the free end of each of said two arms from the extension of said third arm, for orienting said free ends prior to functioning of said free ends and for guiding said free ends during said functioning.

2. In a switch a wiper assembly comprising a body member adapted to be attached to a shaft of said switch, upper and lower electrically conductive resilient wiper arms insulatedly attached to said body member at one end of each arm, the free ends of said arms being adjacent and pretensioned to flex toward each other, said arms having attached to their free ends on respective adjacent surfaces thereof insulating members, and an additional resilient member, one end of which is attached to said body member, the free end of which is adapted to be interposed between said insulating members to separate same and thereby to separate the said free ends of said wiper arms, said insulating members adapted to orient said free ends prior to functioning of said free ends and for guiding said free ends during said functioning.

3. In a switch a wiper assembly comprising a body member adapted to be attached to a shaft of said switch, upper and lower electrically conductive resilient wiper arms insulatedly attached to said body member at one end of each arm, the free ends of said arms being adjacent and pretensioned to flex toward each other, said arms having attached to their free ends on respective adjacent surfaces thereof insulating members, and an additional resilient member, one end of which is attached to said body member, the free end of which is adapted to be interposed between said insulating members to separate same and thereby to separate the said free ends of said wiper arms, said additional resilient member arranged to limit proximity of said arms and insulating members attached thereto in the normal positions of same but to have no effect on separation of said arms from each other further than the said normal position, said insulating members adapted to orient said free ends prior to functioning of said free ends and for guiding said free ends during said functioning.

4. In a switch, a shaft, contact banks, wiper assemblies secured to said shaft, means for actuating said shaft to cause the wipers of said assemblies to engage exposed surfaces of successive contacts in said banks, insulation in said banks for supporting said contacts, said insulation disposed between said contacts and below the level of said exposed surfaces thereof, said wipers adapted to drop below said surface level thereby to engage said insulation when moving between successive contacts in said bank, said wipers constructed such that successive contacts would be bridged thereby if said insulation were not provided as a wiper engaging surface between said successive contacts, said wipers undergoing sufficient wear at the contacting surfaces thereof to enable said wipers to drop further below said surface level to engage said insulation and thereby tending to bridge said successive contacts, and insulating members of said assemblies adapted to engage parts of said banks and arranged to support said worn wipers on said parts when said worn wipers pass between said successive contacts to thereby prevent said worn wipers from dropping further below said surface level and from tending thereby to bridge said successive contacts.

5. In a switch, a shaft, contact banks, contacts arranged in horizontal layers in said banks, wiper assemblies secured to said shaft, means for actuating said shaft to cause each wiper of said assemblies to engage exposed surfaces of successive contacts of a horizontal layer in said banks, insulation in each layer of said banks for supporting contacts of said layers, said insulation disposed between said contacts and below the horizontal level of said exposed surfaces thereof, said wipers adapted to drop below said surface level thereby to engage said insulation when moving between successive contacts in said layer, said wipers constructed such that successive contacts would be bridged thereby if said insulation were not provided as a wiper engaging surface between said successive contacts, said wipers undergoing sufficient wear at the contacting surfaces thereof to enable said wipers to drop further below said surface level to engage said insulation and thereby tending to bridge said successive contacts, and insulating members attached to said wipers and adapted to engage contacts of said banks and arranged to support said worn wipers on said contacts when said worn wipers pass between said successive contacts thereby to prevent said worn wipers from dropping further below said surface level and from tending to bridge said successive contacts.

6. In a switch, a shaft, contact banks, contacts arranged in superimposed horizontal arcuate layers in said banks, wiper assemblies secured to said shaft, means for actuating said shaft to cause each wiper of said assemblies to engage exposed surfaces of successive contacts of a horizontal layer in said banks, insulation in each layer of said banks for supporting contacts of said layer, said insulation disposed between said contacts and below the horizontal level of said exposed surfaces thereof, said wipers adapted to drop below said surface level thereby to engage said insulation when moving between successive contacts in said layer, said wipers constructed such that successive contacts would be bridged thereby if said insulation were not provided as a wiper engaging surface between said successive contacts, said wipers undergoing sufficient wear at the contacting surfaces to enable said wipers to drop further below said surface level to engage said insulation and thereby tending to bridge said successive contacts, and an insulating member attached to each wiper and adapted to engage the last contact in said layer immediately passed over by said wiper and arranged to support said worn wiper on said last contact when said worn wiper passes between said successive contacts thereby to prevent said worn wiper from dropping further below said surface level and from tending to bridge said successive contacts.

VICTOR F. MILLER.

REFERENCES CITED

The following references are of record in the file of this patent:

UNITED STATES PATENTS

| Number | Name | Date |
| --- | --- | --- |
| 1,172,585 | Dobbin | Feb. 22, 1916 |
| 2,259,103 | Drake | Oct. 14, 1941 |

FOREIGN PATENTS

| Number | Country | Date |
| --- | --- | --- |
| 37,317 | Sweden | Aug. 5, 1914 |